United States Patent Office 3,305,436
Patented Feb. 21, 1967

3,305,436
CATIONIC PHOSPHORUS-CONTAINING WET STRENGTH RESIN COLLOID AND PAPER HAVING A CONTENT THEREOF
Henry P. Wohnsiedler, Noroton, Conn., assignor to Formica Corporation, Cincinnati, Ohio, a corporation of Delaware
No Drawing. Filed June 12, 1964, Ser. No. 374,808
8 Claims. (Cl. 162—159)

The present invention relates to an aqueous colloidal cationic solution of a thermosetting phosphorus-containing resin in acid colloid state, and to paper of improved wet strength (and, if desired, of fire resistance) resulting from the presence of the resin in thermoset state on the fibers.

An important advance in the paper-making occurred many years ago when the discovery was made that trimethylolmelamine, in aqueous acid solution, slowly converts itself to a thermosetting cationic acid colloid resin and that paper containing the resin in thermoset state possesses excellent wet strength; cf. U.S. Patents 2,345,543, 2,559,220, 2,559,221 and 2,986,489. Despite many efforts, few other compounds were discovered which behaved in this manner and none were found which contained organically-combined phosphorus.

The discovery has now been made that an acid colloid forms when polyhydroxymethylol tris[(4,6-diamino-triazine-2-)-yl]ethyl phosphine oxide is dissolved in a dilute solution of a strong acid and when the solution is aged.

The further discovery has been made that paper containing this resin in thermoset state possesses excellent wet strength.

The colloid possesses the following particular advantages.

(1) It need not contain more than 1 mol of acid per mol of the phosphorus compound present. This amount of acid is only about ⅓ of the amount of acid needed by the melamine-formaldehyde colloid for its formation. Paper containing the resin of the present invention is consequently less subject to acid tendering than paper containing the melamine-formaldehyde acid colloid.

(2) The colloid acts as fire-retarding agent and, if desired, as fireproofing agent. It thus permits wet strength paper to be prepared which has decreased inflammability and which if desired will not support combustion. Such paper is of military importance.

(3) The colloid need not contain hydrochloric acid and instead may contain sulfuric acid. It accordingly exhibits less sensitivity to dissolved sulfate ions than the melamine-formaldehyde colloid.

(4) The colloid is compatible with the principal known cationic wet strength resins and may be used therewith.

(5) The colloid thermosets rapidly, and does so at a desirably low temperature.

The composition of the acid colloid has not been ascertained and applicant does not wish to be limited by any theory. The evidence, however, is that the colloid is formed of molecules of the triazinyl phosphine oxide which are joined together by condensation of some, but not all of the hydroxymethyl substituents into units having a molecular weight in the range of about 2,000–5,000. The colloid contains sufficient uncondensed —CH$_2$OH substituents so that it is thermosetting, i.e., so that it forms an insoluble and infusible film when flowed on a glass plate and dried at 240° F.

The invention does not depend upon any particular concentration of the colloid in the solution. Useful solutions have been prepared wherein the concentration of colloid has been as low as 1% and as high as 25%, so that evidently compositions on either side of this range are likewise useful.

The invention likewise does not depend upon any critical acidity of the acid colloid solution. Solutions having pH values as high as 3.5 and as low as 2 have given valuable results, so that evidently these values do not define limits. Best results have been achieved when the pH is the natural value imparted by the presence of about 1 molar equivalent of acid per mol of the triazinyl phosphine oxide derivative, and this amount is consequently preferred.

If desired, the colloid solution may contain other materials, for example methanol, ethanol, and acetone as diluents of high volatility, and melamine-formaldehyde acid colloid and urea-formaldehyde-diethylenetriamine resin as auxiliary wet strength agents.

The strength paper of the present invention is composed of water-laid cellulose paper-making fibers bonded together by a normally cationic polyhydroxymethyl tris-[(4,6 - diamino-s-triazine-2-)-yl]ethyl phosphine oxide resin in thermoset state.

The paper possesses commercially significant wet strength when as little as 0.2% of the resin is present, based on the dry weight of the fibers, so that evidently there is no amount however small which will not impart at least some wet strength. The strength of the paper improves as larger amounts are present, but beyond 5% of resin (based on the dry weight of the fibers) the increase in strength imparted by each increment of resin becomes very small so that the presence of a larger amount is usually uneconomic, if judged only from the wet strength point of view.

The fire-retardant paper of the invention contains more than about 8% of the resin based on the dry weight of the fibers. In the range of about 8%–15% resin content by weight the paper supports combustion, but burns with great difficulty if at all. When the paper contains more than about 15% by weight of the resin the paper does not support combustion.

The aqueous acid colloid solution of the present invention is most conveniently prepared by first reacting tris[(4,6-diamino-s-triazine-2-)-yl]ethyl phosphine oxide having the formula

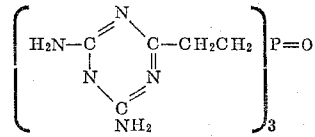

(hereinafter for convenience termed "TEPO") with the desired proportion of formaldehyde so as to convert some (at least two) or all of the —NH$_2$ substituents of the TEPO into hydroxymethylamino substituents, and then aging the resulting material in aqueous solution containing a strong acid. Sufficient development of the colloid occurs when the resin becomes cationic and cellulose-substantive, as determined by test in a cataphoretic cell. Usually, but not always, this is accompanied by development of a blue colloidal haze.

The methylolation reaction is conveniently performed by heating at 80° C. an aqueous solution of the components at a neutral or alkaline pH and at a solids content of about 25%–35% solids until all of the TEPO has dissolved.

Formation of the colloid requires the presence of about 1 mol of a strong monobasic acid (e.g. hydrochloric, nitric and trichloroacetic acids) per mol of TEPO originally taken or an equivalent amount of a polybasic acid (e.g. sulfuric and phosphoric acids), The colloid forms spontaneously when a polymethylol TEPO solution containing the requisite amount of acid is aged at room or elevated temperature. The length of time required for the colloid to form varies from instance to instance depending principally upon the amount of acid present, the number of mols of formaldehyde reacted, and the temperature of the solution and concentration of the resin therein. It is consequently most conveniently determined by trial, using a cataphoretic cell to determine a suitable stopping point.

Development of a thermosetting resin requires the presence of at least two and preferably three methylol substituents per molecule. Such resins are suitable for use when applied to paper by impregnation, using a size press or other similar apparatus. Application of the resin to cellulose paper-making fibers by the beater addition method requires formation of a more advanced (i.e., larger) colloid. In general, the more methylol substituents which are present on the TEPO framework, the more easily a colloid forms and the more wet strength the colloid has. About 6 mols of combined formaldehyde per mol of TEPO is generally sufficient for the purpose, but best results are obtained when the TEPO contains about the maximum amount of formaldehyde, i.e., 10–12 mols per molecule.

The wet strength paper of the present invention is prepared by forming an aqueous acidic suspension of beaten cellulose paper-making fibers, adding thereto sufficient of the colloidal solution to provide a sufficient amount of the colloid for wet strengthening purposes, and drying the web at a temperature in excess of 190° F. The colloid is rapidly adsorbed by the fibers so that the point of addition may be close to the point at which the fibers are sheeted, for example, at the fan pump. The resin develops substantially all of its strengthening effect while the wet web dries, which in modern high speed machines takes place in ¼ to 1 minute.

The fire retardant paper of the invention can be made by saturating paper with a solution containing at least about 8% by weight of the resin and drying the paper at a temperature at which the resin thermosets. The resulting paper has the appearance and feel of ordinary paper, but does not support combustion.

TEPO is prepared by refluxing a mixture of 150 ml. of ethyl Cellosolve, 38.6 g. of tris 2-cyanoethylphosphine, 56.0 g. of dicyandiamide, and 3.4 g. of powdered potassium hydroxide for four hours, by collecting and digesting the precipitate with 2 N hydrochloric acid, filtering and precipitating the TEPO with 2 N sodium hydroxide. This compound is claimed in copending application Serial No. 497,539 filed by Gerald A. Johnson on October 18, 1965.

The invention will be more particularly described with reference to the examples. These examples represent specific embodiments of the invention and are not to be construed as limitations thereof.

Example 1

A resin solution suitable for impregnating paper to provide wet strength and resistance is prepared as follows.

A mixture of 46.1 g. (0.1 mol) of tris[(4,6-diamino-s-triazine-2-)-yl]ethyl phosphine oxide (hereinafter termed "TEPO"), 24.3 g. (0.3 mol) of 37% aqueous formaldehyde (containing 7% by weight of methanol) and 87.0 g. of water is heated to 100° C. over 50 minutes and is maintained at that temperature for 6 minutes. The pH of the solution is 9.6. To this solution 20 ml. of N/2 HCl are added (1 mol of acid per mol of the phosphine oxide) forming a clear solution having a pH of 3.5. The solution is cooled at once to room temperature.

When a sample of the solution is evaporated to dryness in a dish at 50° C., the deposited resin thermosets to a clear resinous film insoluble in boiling water.

A sample of the solution is diluted to 17% solids content by addition of water, and a second sample is diluted to 8.5% solids. Strips of unsized paper are impregnated with the solution to approximately 100% by weight liquid pick-up and are dried at 200° F. for 3 minutes.

All strips possess wet strength.

The strip containing 17% by weight of the resin when held over a match flame does not support a flame when ignited horizontally and vertically. The strip containing 8.5% by weight of the resin supports combustion when held vertically, but not when held horizontally.

Example 2

The following illustrates the preparation of an aqueous acid solution of dodecyl hydroxymethyl TEPO in colloidal cationic state.

A mixture of 461 g. (1 mol) of TEPO, 975 g. (12 mols) of 37% aqueous formaldehyde solution, and 206 ml. of water having a pH of 9 is heated at 95° C. with stirring for 10 minutes. The resulting clear solution contains dodecyl hydroxymethyl TEPO and has a pH of 6.8. To the solution is added 85 ml. (1 mol) of 36% hydrochloric acid and 1710 ml. of water and the mixture is heated for 25 minutes at 50° C. The resulting solution contains about 24% by weight of resin solids, has a pH of 2.5 and on standing at room temperature develops a strongly opalescent Tyndal haze. The use of this colloid as a beater additive for the manufacture of wet strength paper is shown in Example 4.

Example 3

The following illustrates the preparation of an acid colloid solution similar to that of Example 2, by use of sulfuric acid.

The procedure of Example 2 for the reaction of TEPO with formaldehyde is repeated. Two portions of the solution are withdrawn, each containing 0.25 mol of reacted TEPO. To these portions (marked A and B) are respectively added 120 g. and 240 g. of 10% $H_2SO_4$ (respectively 1 and 2 molar equivalents of $H_2SO_4$ per mol of reacted TEPO). The resulting solutions convert into acid colloid state on aging at room temperature. Paper when impregnated with these solutions diluted to 2% solids and dried at 200° F. develops very substantial wet strength, better wet strength being obtained from the resin which contains 1 molar equivalent of the acid.

Example 4

The following illustrates the preparation of wet strength paper composed of fibers bonded together by a content of a hydrophilic cationic TEPO acid colloid in uniformly adsorbed thermoset state.

An aqueous suspension of well-beaten bleached, northern kraft cellulose paper-making fibers containing sufficient alum to have a dissolved $SO_4^{--}$ content of 100 p.p.m. is adjusted to pH 4 by addition of hydrochloric acid.

Three aliquots are taken. One is retained as control and to this nothing is added.

To one of the remaining aliquots is added sufficient of a colloidal resin solution of Example 2 which has been aged 50 hours to provide 2% of resin solids based on the dry weight of the fibers, and to the other a similar colloid solution which has been aged 56 hours.

The suspensions are sheeted on a Nash handsheet machine to form water-laid webs, and the webs are dried by one pass (2 minutes) through a rotary laboratory drum drier having a drum surface temperature of 198° F.

The resulting sheets have a basis weight of 45 lb. per 25″ x 40″/500 ream and contain the resin in uniformly adsorbed thermoset state. The sheets are conditioned by storage for 50 hours at 72° F. and 50% relative humidity, and the dry and wet tensile strengths of the sheets are determined by standard laboratory method. Results are as follows:

| Run No. | Resin | | | Tensile Strength, Dry | | Lb./inch, Wet, found |
|---|---|---|---|---|---|---|
| | Percent | Sample | Hrs. Aged | Found | Percent Incr. | |
| 1 | None | Control | | 32.6 | | 0.5 |
| 2 | 2 | Example 2 | 50 | 36.9 | 13.3 | 7.6 |
| 3 | 2 | ---do--- | 56 | 38.1 | 16.8 | 8.2 |

I claim:
1. An aqueous acid solution of thermosetting polyhydroxymethyl tris[(4,6 - diamino - s-triazine-2-) - yl]ethyl phosphine oxide in cationic colloidal state.
2. An aqueous acid solution of thermosetting dodecylhydroxymethyl tris[(4,6-diamino-s-triazine-2-) - yl]ethyl phosphine oxide in cationic colloidal state.
3. An aqueous acid solution according to claim 1 containing 1 molar equivalent of acid per mol of said triazinyl phosphine oxide.
4. Wet strength paper composed of water-laid cellulose paper-making fibers bonded together by a normally colloidal cationic polyhydroxymethyl tris[(4,6-diamino-s-triazine-2-)-yl]ethyl phosphine oxide resin in thermoset state.
5. Paper according to claim 4 wherein the resin is present on the fibers in uniformly adsorbed state.
6. Wet strength paper composed of water-laid cellulose paper-making fibers bonded together by a normally colloidal cationic dodecylhydroxymethyl tris[(4,6-diamino-s-triazine-2-)-yl]ethyl phosphine oxide in thermoset state.
7. Wet strength fire-resistant paper composed of water-laid cellulose paper-making fibers bonded together by more than 8% based on the dry weight of the fibers, of a normally colloidal cationic polyhydroxymethyl tris[(4,6-diamino-s-triazine-2-)-yl]ethyl phosphine oxide in thermoset state.
8. Paper according to claim 7 containing more than 15% by weight of said triazinyl phosphine oxide.

References Cited by the Examiner
UNITED STATES PATENTS
2,983,623  5/1961  Coates _____ 162—159 X
3,210,350  10/1965  D'Alelio _____ 260—249.8 X DONALL H. SYLVESTER, *Primary Examiner.*

S. LEON BASHORE, *Examiner.*